United States Patent [19]

Raviv et al.

[11] Patent Number: 4,792,196
[45] Date of Patent: Dec. 20, 1988

[54] INTERNAL STRUCTURE HOLOGRAPHY

[75] Inventors: Gil Raviv, Chicago; Michel E. Marhic, Evanston; Max Epstein, Highland Park, all of Ill.

[73] Assignee: Northwestern University, Evanston, Ill.

[21] Appl. No.: 947,702

[22] Filed: Dec. 30, 1986

Related U.S. Application Data

[62] Division of Ser. No. 518,440, Jul. 29, 1983, Pat. No. 4,643,513.

[51] Int. Cl.$^4$ .................. G03H 1/02; G02B 23/26; G02B 6/22; A61B 1/06
[52] U.S. Cl. .................. 350/3.6; 128/634; 350/96.26; 350/96.33
[58] Field of Search .................. 350/3.6, 96.26, 96.33; 128/634

[56] References Cited

U.S. PATENT DOCUMENTS

| | | | |
|---|---|---|---|
| 3,914,013 | 10/1975 | Rosenberg | 350/96 B |
| 3,920,980 | 11/1975 | Nath | 240/1 LP |
| 3,960,448 | 6/1976 | Schmidt et al. | 356/32 |
| 4,011,403 | 3/1977 | Epstein | 358/209 |
| 4,072,147 | 2/1978 | Hett | 128/6 |
| 4,114,112 | 9/1978 | Epstein et al. | 331/94.5 C |
| 4,170,997 | 10/1979 | Pinnow et al. | 128/395 |
| 4,195,624 | 4/1980 | Douglas | 128/8 |
| 4,211,229 | 7/1980 | Wurster | 128/303.1 |
| 4,273,109 | 6/1981 | Enderby | 128/6 |
| 4,281,931 | 8/1981 | Chikama | 356/372 |
| 4,313,431 | 2/1982 | Frank | 128/7 |
| 4,336,809 | 6/1982 | Clark | 128/665 |
| 4,354,730 | 10/1982 | Bel | 350/354 |
| 4,367,729 | 1/1983 | Ogiu | 128/6 |

OTHER PUBLICATIONS

J. Dorheide and H. E. Hoyer, "Holografische Schwingungsuntersuchungen am menschlichen Schadel", Unfall-heilkunde Traum. 84, pp. 345-349 (1981).
A. B. Hewitt, "Holographic Investigation of Bone Response to Small Forces," Br. J. Orthodontics, 8, pp. 43-46 (1981).
K. Tatsuno and A. Arimoto, "Hologram Recording by Visible Diode Lasers," Applied Optics 19 (13), 2096 (1980).
A. R. Tokuda, D. C. Auth, and A. P. Bruckner, "Holocamera for 3-D Micrography of the Alert Human Eye," Applied Optics 19(13), pp. 2219-2225 (1980).
A. Hofstetter, R. Bovering, E. Keiditsch, and H. Wachutka; "Interferometric Laser Holography for Determination of the Localization and Extent of Bladder Tumor", Eur. Urol. 5, pp. 120-127 (1979).
B. Hok, K. Nilsson and H. Bjelkhagen, "Imaging of Chest Motion Due to Heart Action by Means of Holographic Interferometry," Med. and Biol. Eng. and comput. 16, pp. 363-368 (1978).
R. J. Pryputniewicz, C. J. Burstone and W. W. Bowley, "Determination of Arbitrary Tooth Displacements," J. Dent. Res. 57, pp. 663-674 (1978).
B. Schwaninger, R. Schmidt and R. Hurst, "Holography Dentistry," JADA 95, 814 (1977).
D. Hadbawnik, "Holographische Endoskopie," Optik 45, No. 1, pp. 21-38 (1976).
J. Gwignon and O. Pomerantzeff, "Wide-Angle Holography of the Eye," Trans. Amer. Acad. Opthalamol. 76, pp. 1214-1220 (1972).

Primary Examiner—Bruce Y. Arnold
Attorney, Agent, or Firm—Welsh & Katz, Ltd.

[57] ABSTRACT

A method and apparatus are provided for the holographic examination of the internal features of cavities and passageways of a structure. The apparatus employs a laser beam source positioned external of the structure coupled to a multilayer fiber waveguide which conveys the reference beam and object beam, in at least two different layers of the multilayer fiber, which combine in a holographic recordation means to form a hologram of the internal features of the structure, or under certain circumstances a holographic interferogram of the selected features is formed.

17 Claims, 4 Drawing Sheets

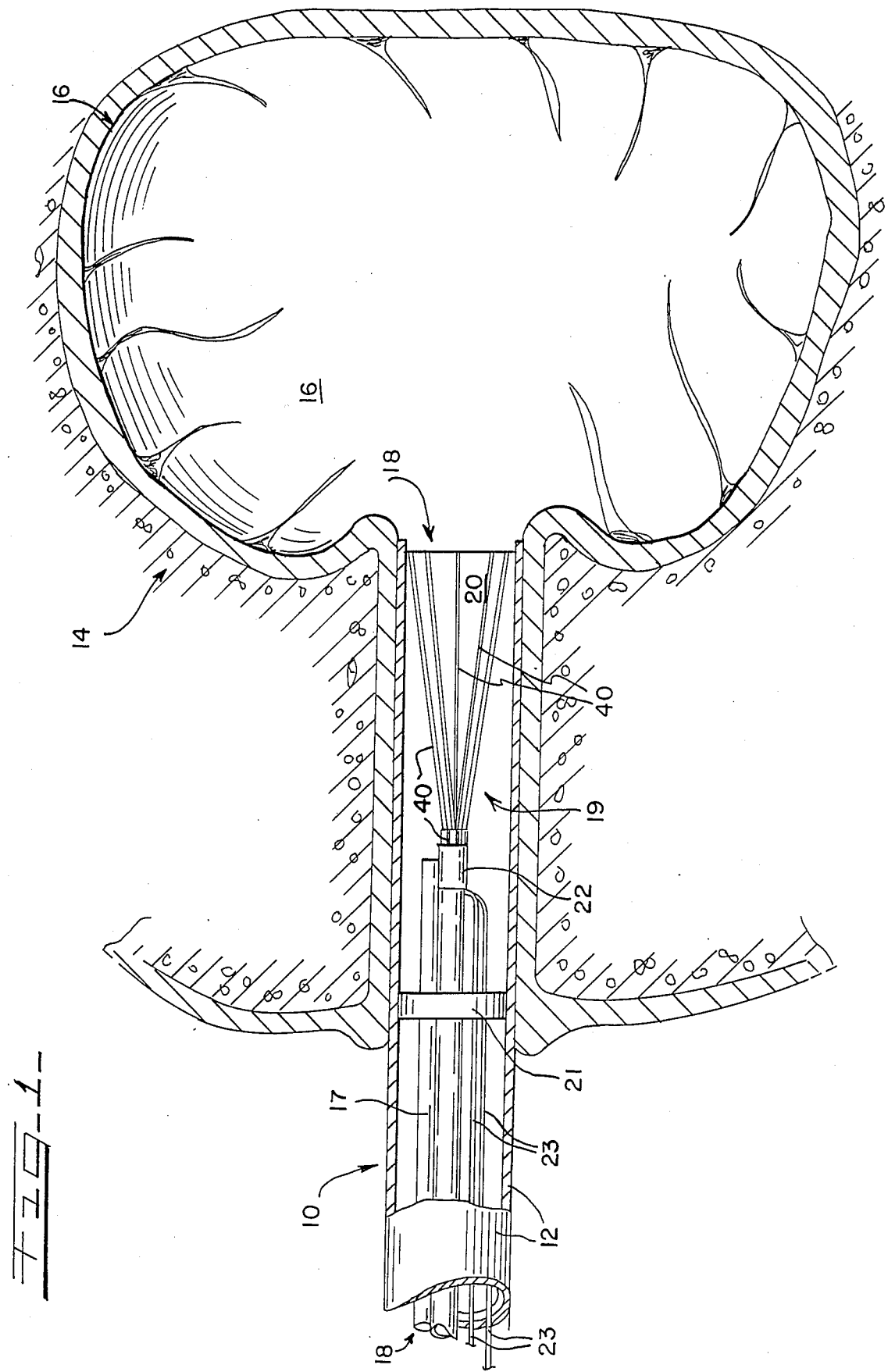

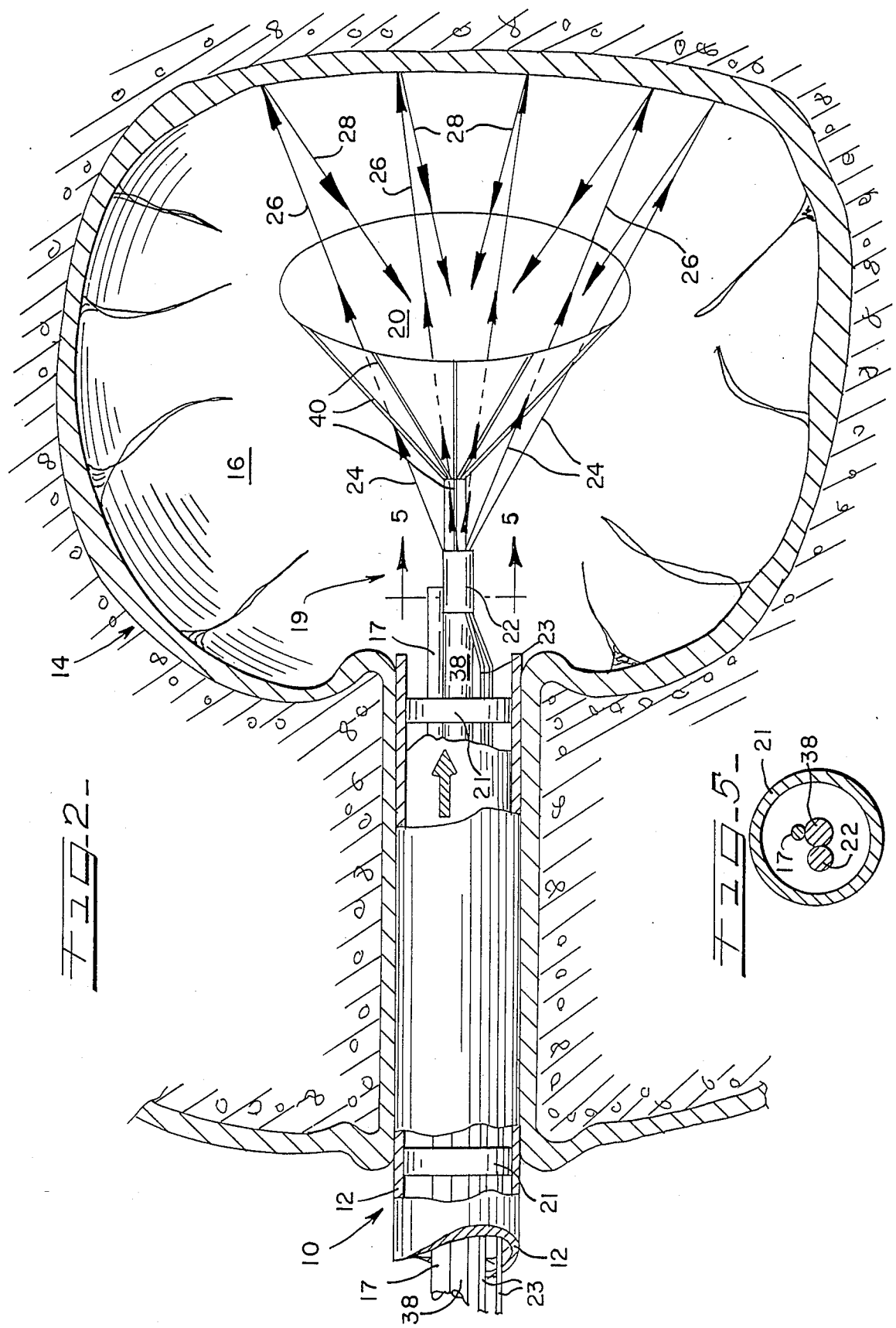

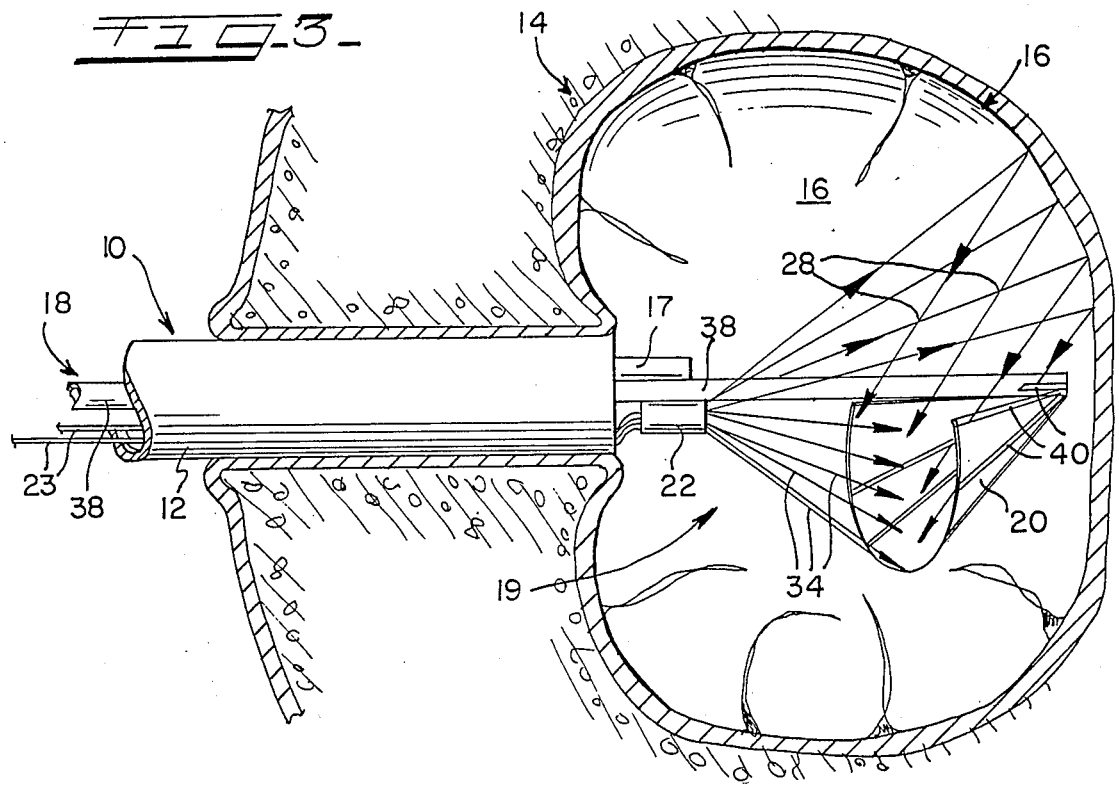
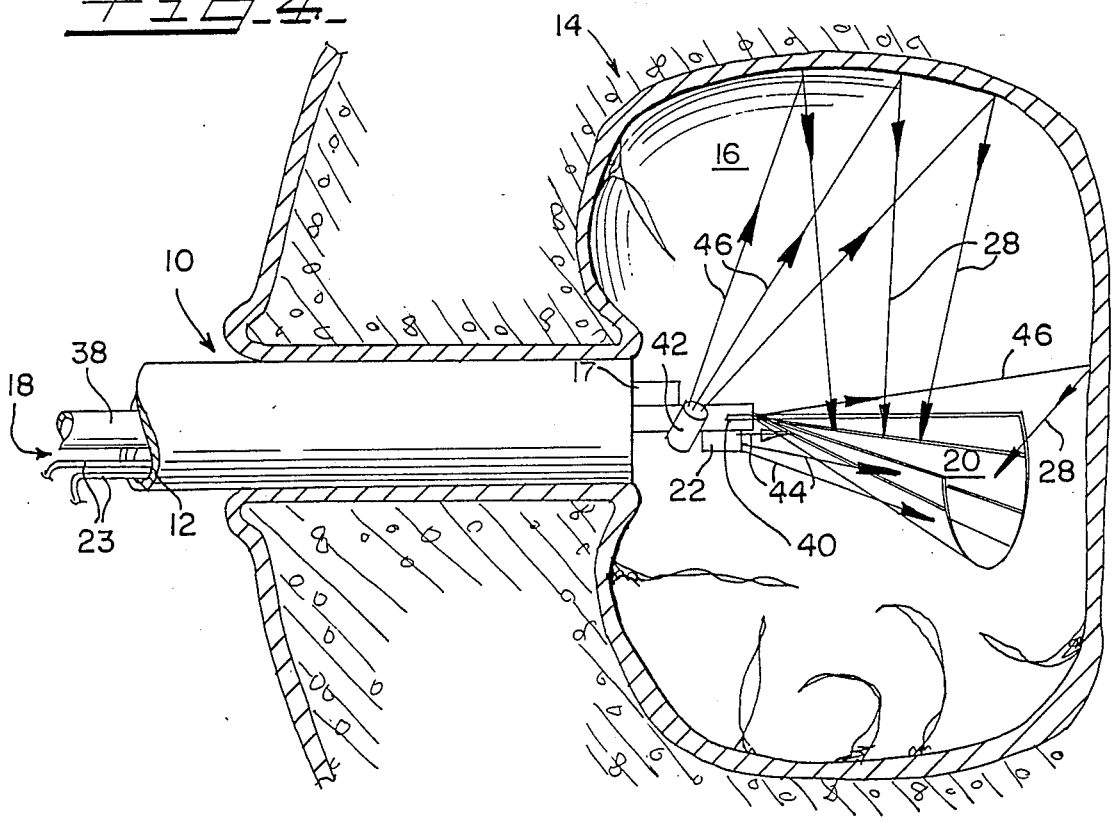

FIG_6A
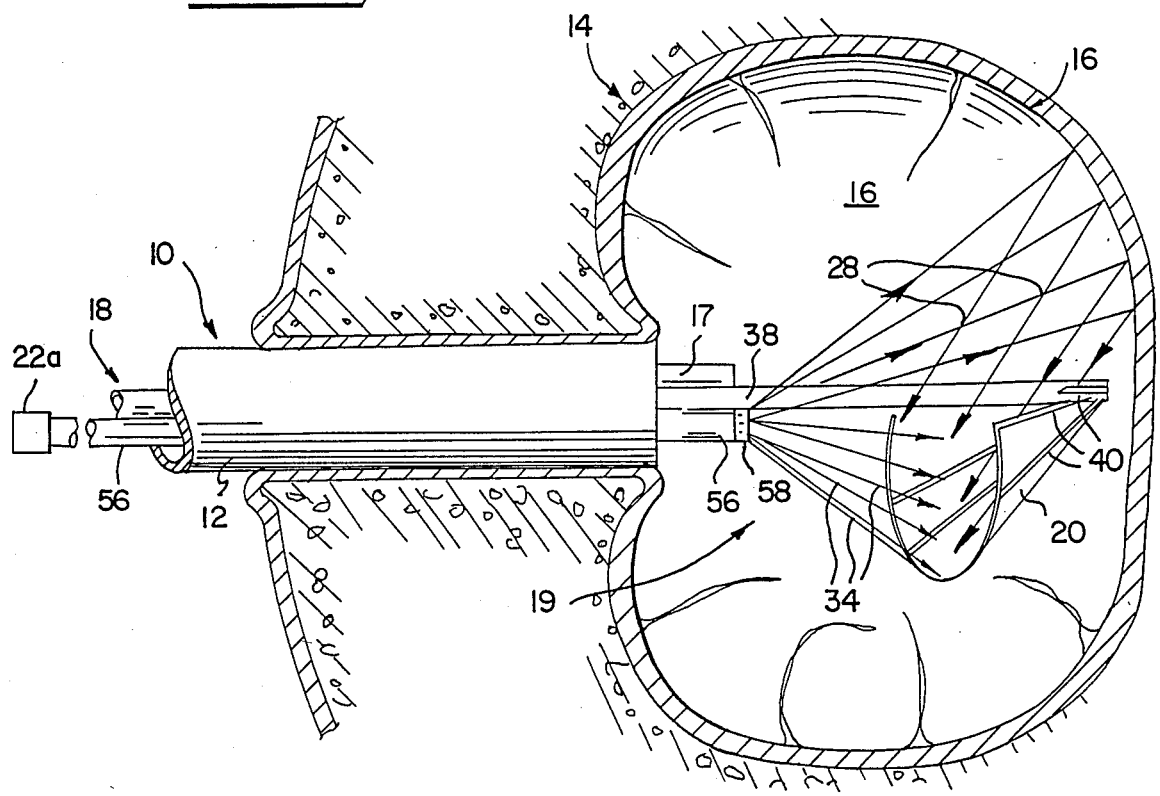
FIG_6B
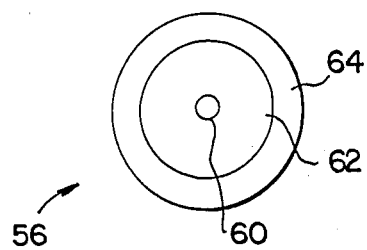

INTERNAL STRUCTURE HOLOGRAPHY

This is a division, of application Ser. No. 518,440, filed 7/29/83 now U.S. Pat. No. 4,643,513.

The present invention relates to a method and apparatus for internal examination of cavities and passageways of various structural bodies, and includes a method and apparatus for examination of the internal features of organs and passageways of the human body and of various regions of mechanical structures. More particularly, this invention concerns the use of laser beam sources placed outside of structure for laser hologram recordation of the appearance of selected features of cavities and passageways of the structure.

Previous methods and apparatus for examination of the internal features of selected cavities and passageways of structures have suffered from a number of deficiencies and limitations. Prior methods and apparatus include the use of motion picture recordation and various still photography techniques which only provide two dimensional visualization of the structure. The technique of passage of a small optical viewing fiber into the structure limits the examination to an extremely small field of view, typically on the order of several millimeters in diameter. Another method employs x-ray scanning from a variety of angles, but this has much lower resolution than holographic techniques. Furthermore, such equipment is expensive to purchase and maintain, and the radiation exposure may prove harmful to the subject structure in the case of living tissue examinations. Current laser holographic techniques for internal examination utilize external laser beam sources which are quite expensive to purchase and maintain. They also are impractical to use due to assembly and alignment difficulties. In addition, they provide, under the best circumstances, only marginal quality holograms of the desired structure.

A general object of the present invention is to provide a method and apparatus for recordation of holograms of the internal features of selected cavities and passageways of various structural bodies.

A more particular object of the invention is to provide a method and apparatus for hologram recordation using a laser placed external of the selected cavity or passageway of the structure.

A further object is to provide a laser holographic apparatus to characterize motion, vibration and deformation of selected internal features of structural bodies.

Accordingly, the instant invention includes at least one lasing means positioned outside selected structural cavity or passageway and capable of generating a laser beam within the cavity or passageway to be examined by holography, means for establishing a laser reference beam and a laser object beam within the structure, recordation means such as film for obtaining a hologram of the appearance of the selected structural cavity or passageway, and a means for placement within and recovery of the recordation means from the cavity or passageway of the structure. The lasing means comprises an externally positioned laser coupled to a multilayer fiber waveguide which conveys the object and reference beams in at least two different layers of the multilayer fiber the selected location within the structure. The recordation means includes a medium which can store holographic information and enable hologram reconstruction, such as laser light sensitive photographic film. The placement means comprises the probe housing, the holocamera and any necessary structural elements which enable positioning and setup of the holocamera at the desired location, and recovery of the holocamera after the hologram is formed.

Further objects and advantages of the present invention, together with the organization and manner of operation thereof, will become apparent from the following detailed description of the invention taken in conjunction with the accompanying drawings, in which:

FIG. 1 is a cross-sectional view of a cavity and passageway of a structure and a holographic probe positioned within the passageway of the structure;

FIG. 2 is a cross-sectional view of the holographic probe positioned in the cavity of the structure with a holocamera positioned to produce a single beam reflection hologram;

FIG. 3 is a cross-sectional vie of the holographic probe positioned in the cavity of the structure with the holocamera positioned to produce a single beam transmission hologram;

FIG. 4 is a cross-sectional view of the holographic probe positioned in the cavity of the structure with the holocamera positioned to provide a two beam reflection hologram; and FIG. 5 is a fragmentary vertical sectional view taken substantially along line 5—5 of FIG. 2.

FIG. 6A is a cross-sectional view of the holographic probe positioned in the cavity of the structure with an external laser means and multilayer fiber to conduct the laser light into the cavity.

FIG. 6B is a vertical sectional view of a multilayer fiber.

Referring to FIGS. 1-5, each holographic probe 10 generally includes a placement means such as probe housing 12, which may be rigid or flexible as needed to enable the placement or positioning of the distal, or examining, end of the probe housing 12 within the selected cavity or passageway of the structure, for example, within a cavity 14 to enable laser holographic recordation of the appearance of cavity walls 16. The positioning of the holographic probe 10 may be aided by an optical viewing fiber 17 to permit the examiner to maneuver the distal end of the holographic probe 10 to the desired location within the structure. In a preferred configuration the probe housing 12 is a flexible cylindrical tube and provides probe passageway 18 for transfer to the cavity 14 of a holocamera, indicated generally at 19. The holocamera 19 includes the viewing fiber 17, a lasing means and a recordation means for formation of the desired hologram. The holocamera 19 must be coupled to the distal end of the probe 10 or to a separate placement means to enable the holocamera 19 to be moved through the probe passageway 18 and to be placed at the desired location. One method of assisting in the smooth transfer of the holocamera 19 through the passageway 18 is to use one or more center spacer rings 21 which are positioned around the various components of the holocamera 19 and which support these components near the center of the passageway 18 of the probe housing 12 (i.e. see the fragmentary vertical sectional view of FIG. 5). The smooth, outer circumferential surface of the spacer rings 21 has a slightly smaller diameter than the inside diameter of the probe housing 12 and rides against the smooth inner walls of the probe housing 12 and therefore enables the smooth transfer of the holocamera 19 through the passageway 18.

The lasing means positioned within the cavity 14 includes at least one laser beam source, such as a conventional laser waveguide terminating within the cavity 14 to provide a laser beam from an external laser source, or alternatively from an internally positioned diode laser 22 as shown in FIGS. 1–4. The recordation means is preferably photographic film 20 sensitive to laser light and typically is a silver halide based film sensitive to laser light with a wavelength below 750 nm.

Diode lasers provide an extremely compact form of lasing means since the diode dimensions are typically in the millimeter size range, and as shown in FIGS. 1–4 the only electrical connections are two small wire leads 23 to and from each diode to provide power from a power supply (not shown). Therefore, by using diode lasers, the size of the holocamera 19 can be drastically reduced. Reducing the size of the holocamera 19 thus simplifies the recordation of a hologram within the cavity 14 of a structure, particularly for hologram recordation in a small cavity or in a cavity which is accessible only through a very narrow passageway. Examples of diode lasers which emit in the range of sensitivity of the preferred silver halide based film include GaAlAs diodes with a wavelength of 748 nm (see Appl. Optics 19(13), 2096, (1980)) and AlGaAs double heterojunction diodes with a wavelength of 680 to 700 nm at room temperature (see Appl. Phys. Lettr. 41(9), 796 (1982)). These reference materials are incorporated by reference herein.

It is also possible to control a plurality of laser sources, such as laser diodes, to obtain an appropriate optical interrelationship to provide phase-locked coherent laser output pulses. Examples of phase-locked coherent laser operation may be found in Paper Numbers TUC 5, "High Power Diode Lasers," and WB 2, "High Power (2.5 W) Continuous Wave Phase-Locked Diode Laser Arrays with Coated Facets," from the Conference on Lasers and Elecrro-Optics, Baltimore, Md., May 17–20, 1983. These papers are incorporated by reference herein. Phase-locked coherent laser pulses may be obtained from a plurality of coupled diode lasers which are combined to have laser light output of the same frequency and phase, which results in greatly increased power output. For example, an array of diode lasers may be coupled to achieve the desired optical interrelationship by leaking a portion of the laser light from one diode laser to each succeeding diode laser. This method causes the phase and frequency of the emitted laser beam to be the same for the entire array.

Such phase-locked laser output pulses result in a much larger power output than from a single diode laser. This increased coherent power output enables holographic examination of much larger areas and recordation of holograms with much shorter exposure times. Further, such an increased output permits holography under dynamic conditions, such as holographic interferogram recordation of structures undergoing rapid motion or vibration. Interferogram recordation will be discussed in more detail hereinafter.

In the illustrated embodiment of FIG. 2 the diode laser 22 is positioned behind the film 20 with the concave opening of the film 20 facing away from the diode laser 22. The diode laser 22 emits a laser beam which is partially absorbed by the film 20. This portion of the laser beam which is substantially unperturbed by any intervening medium is essentially a pulse of coherent plane waves and is denoted as a laser reference beam 24. A portion of the laser beam emitted by the laser diode 22 is transmitted through the film 20 as transmitted laser beam 26 which strikes the cavity walls 16, is reflected back toward the film 20 and is absorbed by the film 20. The reflected portion of the transmitted laser beam 26 is referred to as an object beam 28. The combining of the object beam 28 and the reference beam 24 in the film 20 creates the desired hologram in the film 20 in a manner known to those of ordinary skill in the art. See, for example, Handbook of Optical Holography, H. J. Caulfield, Academic Press, New York, N.Y. (1979), which is incorporated by reference herein. This particular optical geometry in FIG. 2 is referred to as a single beam reflection mode, wherein the hologram is formed from the reference beam 24 and the object beam 28, which are both derived from a single beam and are incident upon the film 20 from different sides. In order to reconstruct the reflection hologram, white light is used to illuminate the film 20 on the same side as the viewer.

In an alternative embodiment shown in FIG. 3 the diode laser 22 is positioned facing the concave opening of the film 20 which is shown in a half umbrella configuration. The diode laser 22 emits a laser beam, which is in part transmitted directly to and absorbed by the film 20, and this absorbed portion is denoted as reference beam 34. The remainder of the laser beam emitted by the diode laser 22 is transmitted directly from the diode laser 22 to the cavity walls 16, and is reflected from the cavity walls 16. This reflected object beam 28 is absorbed by the film 20 and combines with the reference beam 34 to create the desired hologram. This optical geometry is referred to as a single beam transmission mode, wherein the hologram is formed from the object beam 28 and the reference beam 34 which are both derived from a single beam and are incident upon the film 20 from the same direction. To reconstruct an image from a transmission hologram, the hologram must be illuminated with laser light from behind the film 20 with the viewer on the other side of the film 20.

The means for recordation of the hologram may include any medium which can store optical holographic information and enable hologram reconstruction and includes photographic materials, photoresists, photopolymers photoplastics, photochromics and other laser light sensitive media. These media are then positioned on suitable substrates which can support the light sensitive media and have appropriate physical properties to enable positioning within a selected structure for recordation of a hologram (see Handbook of Optical Holography, cited hereinbefore, for discussions of recordation means).

If photographic film is employed, the film 20 should be configured to enable movement through the passageway 18 of the probe housing 12. For example, the film 20 may be placed in the selected location by means of a reel type film attachment which contains the film 20 and extends from outside the structure to be examined, passes through the passageway 18 to the distal end of the probe housing 12 and returns through the passageway 18 to a location external to the structure. Such a device would permit a plurality of sequential holograms to be formed and would suggest the ability to prepare a holographic motion picture record of the selected internal features of the structure.

Alternatively, the film 20 may be portable and thus be positionable within the probe housing 12 in a collapsed or folded configuration and also be transferrable through the passageway 18 of the probe housing 12 to the cavity 14. FIG. 1 illustrates the film 20 in a collapsed or folded state within the probe housing 12. FIGS. 2-4 show three portable, unfolded film configurations including a full umbrella shape and two partial umbrella configurations. The partial umbrella configurations in FIGS. 3 and 4 are approximately half umbrella shapes, one oriented concave and one oriented convex with respect to the diode laser 22. Numerous other film shapes may be utilized including, but not limited to, inflated or inflatable balloon configurations, truncated conical geometries, one or more cylindrical scroll configurations, spiral arrangements and combinations of spiral and cylindrical configurations. Other film geometries are also permissible provided they can be transferred through the passageway 18 of the probe housing 12, be unfolded within the cavity 14 and be refolded and recovered outside the structure after hologram formation.

Some portable film configurations, such as a truncated conical geometry may be unfolded in a selected structural cavity by virtue of their ability to open due to internal shape tensions. Refolding may be accomplished by withdrawal of the rod 38 and the film 20 attached thereto and forcing the conical film shape to collapse into a folded position upon encountering the passageway 18. However, unfolding and refolding of the film 20 may also require the assistance of wire couplings or other mechanical contrivances attached to support rod 38 or may utilize air pressure to inflate balloon type film configurations. An example of one mechanical device is the inclusion of an array of deployable structural members such as the umbrella type structural members 40 coupled both to the rod 38 and to the film 20, as shown in FIGS. 2-4. Deployment and retraction of such members 40 may be accomplished with a spring loaded mechanism (not shown) or other mechanical means commonly used in conventional umbrellas. The structural members 40 therefore act to force loosely packed film into a taut predictable configuration, as shown in the exemplary umbrella configurations of FIGS. 2-4. It may also be possible to effect unfolding and refolding of the film 20 by using particularly sensitive media associated with the film 20 such as film substrate material or structural members coupled to the film 20 which are responsive to temperature changes communicated to the sensitive media or to application of electrical or magnetic fields to the particularly sensitive media.

In another embodiment of the invention shown in FIG. 4, a second diode laser 42 is coupled to the rod 38 as part of the holocamera 19. In this aspect of the invention the second diode laser 42 must have essentially the same frequency as the first diode laser 22, that i,, the frequency difference between the first and second lasers should be about the inverse of the hologram exposure time. The first diode laser 22 is also coupled to the rod 38 and is positioned to direct substantially toward the film 20 a first output beam 44 which assumes the role of the hologram reference beam. The second diode laser 42 is suitably positioned on the rod 38 to produce a second output beam 46 which is substantially directed toward the walls 16 and reflects from the walls 16 to form the laser object beam 28 which combines in the film 20 with the first output beam 44 (the reference beam) to form the desired hologram. In another aspect of this form of the invention, rather than using two diode lasers, a single diode laser 22 may be used by employing the two laser beams emitted from the top and bottom of the diode. By appropriate use of mirrors the reference and object beams may be obtained from this single diode. Therefore, by using only one diode the reference and object beams have virtually identical frequencies which will enable formation of the desired hologram. The relative output from the top and bottom of the diode laser is also variable by appropriate elecltronic control and design. Therefore, depending on the intended use of each beam, the ratio of top to bottom output from the single diode may be changed. Furthermore, one may choose to change the use of the top diode beam from a reference beam to an object beam or change the use of the bottom diode beam from an object beam to a reference beam.

Virtually all the selected area of the walls 16 of the cavity 14 may be holographically recorded by the film 20 by using a plurality of the second diode lasers 42. Furthermore, various inactive optical means, such as beam splitters, may also be used to spread the output laser beams. For example, various forms of beam splitters may include mirrors and/or lenses attached to the placement means. Such beam splitters may be used with a plurality of diode lasers or for one diode laser. As discussed previously, beams can be obtained from the top and bottom of one diode to provide a plurality of object beams. By using beam splitters in conjunction with the single diode or a plurality of diodes, object beams 28 may be obtained from virtually all the walls 16 of the cavity 14 and therefore enable recordation of a hologram characteristic of virtually all of the walls.

Color recordation of a hologram is also possible by using appropriately selected colored laser sources to form the necessary reference and object beams. For example, illumination of a structure with green, blue, and red laser beams will form a full color hologram which upon reconstruction will appear to the human eye to be a full color representation of the illuminated structure.

In another aspect of the invention shown in FIG. 6A the laser beam illumination of the walls 14 within the cavity 16 of the structure may be provided by means of waveguides 56 coupled to an external lasing means 22a to provide an internal laser beam for illumination of the internal features of the cavity 16. These waveguides are required in order to conduct the necessary laser object beams and reference beam from a laser beam source positioned outside the structure. In a preferable form the waveguide shown in FIG. 6B includes a multilayer optical fiber wherein the laser reference beam is confined to a core fiber 60 which has a small enough diameter to achieve single mode propagation of the reference beam in a manner known in the art. The core fiber diameter is typically 2 to 10 microns. The waveguide also includes one or more object beams propagated along at least one of the remaining fiber layers.

A preferable form for the multilayer waveguide may include, for example, a core fiber 60 with a sufficiently small diameter and the largest index of refraction and succeeding waveguide layers 62, 64 with a progressively lower index of refraction. In a particular version of this selected arrangement the waveguide has a core fiber 60 and only two additional layers 62, 64. In this version a reference laser beam is provided from the core fiber and an object laser beam from the layer adjacent the core fiber. Such a version has the important advantage that most of the laser beam incident on the input side of the waveguide will enter either the core fiber as a reference beam or the second layer as an object beam. Therefore, this arrangement does not require precise alignment of waveguide and beam source to enable efficient use of most of the incident laser beam. Other waveguide configurations are also possible wherein the reference beam is confined to the core fiber, and a plurality of object beams are guided by a plurality of layers surrounding the core fiber.

In some waveguides the reference beam may be separated from the object beam components by various inactive optical means, 58 such as pinhole apertures and various optical filtering means which are placed near the smooth termination of the central core fiber of the waveguide at the distal end. Furthermore, gratings may be placed on the distal end of a selected fiber layer and enable the laser object beam, which is guided by that selected layer, to be separated from the reference beam. By appropriate fiber positioning and the use of apertures, and beam splitters such as mirrors and/or lenses, a variety of desired orientations and intensities of object and reference beams may be attained.

It will be appreciated that the probe housing 12 might take other forms than the illustrated housing, such as self-contained cannisters which traverse long or difficult passageways and upon entry into the selected cavity of the structure, the cannister may be opened by remote control or other means to perform the necessary functions to provide the desired hologram. The probe housing 12 may then close and return to a transportable shape (a smooth shape such as spherical or egg-shaped, for example) for transfer from the internal cavity and recovery outside the structure.

One of the most significant applications of the holographic apparati described herein is for formation of a hologram of the appearance of various internal features of structures. However, it is also possible to form a laser holographic interferogram which is descriptive of the displacement or vibration of various internal features of a structure or which gives a contrast map of topology.

An object in motion within structure may be characterized by formation of an interferggram produced by two consecutive pulses of laser light of the same frequency reflected from the object in motion. Each separate pulse includes the object and reference beam with the same optical relationship among the laser beams, the selected object and the film as for a conventional hologram. In general, all interferograms require this same optical relationship as a hologram. The reconstructed image from this particular laser holographic interferogram exhibits dark and bright interference fringes which have a spacing characteristic of the displacement of the structure during the interval between laser pulses. Using this technique it is possible to examine detailed deformation processes and dynamic motion of structures employing the fine resolution of laser holography.

A time averaged interferogram of the internal features of the structure may be obtained by providing one pulse of laser light which has a pulse time duration longer than one time period of the vibrational frequency of the subject internal features. The resulting interferogram provides a mapping of dark and light rings which are characteristic of the vibrational motion of the subject features being examined.

In another version of the invention the internal topography of a structure may be examined by generating laser pulses with two frequency components or by using two or more laser sources with different frequencies. The two frequencies interact to provide an interferogram which is descriptive of the contours of the subject internal topology.

While there have been described herein various embodiments illustrative of the present invention, modifications will be apparent to those skilled in the art. Various features of the invention are defined in the appended claims.

What is claimed is:

1. An apparatus for laser holographic examination of the internal features of cavities and passageways of a structure comprising:

laser means capable of generating at least one beam external to said structure;

laser beam waveguide means comprising a multilayer fiber for simultaneously performing as a single mode laser reference beam waveguide and as an object beam waveguide, and said waveguide means coupled to said lasing means for conducting at least one said laser beam generated external to said structure through multiple layers of the multilayer fiber to said cavities and passageways of said structure to provide an internal laser beam from each of at least two different layers of the multilayer fiber to form at least two internal laser beams for illuminating said internal features for hologram formation;

means for establishing a laser object beam from one of said internal laser beams within said structure;

means for establishing a laser reference beam from another of said internal laser beams within said structure;

recordation means capable of obtaining a laser hologram within said structure; and placement means for placing said recordation means within said structure and for recovering said recordation means from said structure.

2. The apparatus as in claim 1 wherein said waveguide means comprises a three layer fiber with said core fiber having the largest index of refraction and succeeding layers having a progressively lower index of refraction.

3. The apparatus as in claim 1 further characterized in that said means for establishing a laser object beam comprises a grating positioned on the distal end of a selected portion of said waveguide.

4. The apparatus as in claim 3 wherein said selected portion of said waveguide comprises an object beam fiber portion of said waveguide.

5. The apparatus as in claim 1 further characterized in that said means for establishing a laser reference beam comprises a pinhole aperture positioned adjacent a smooth termination of said core fiber positioned within said structure.

6. The apparatus as in claim 1 further characterized in that said means for establishing said laser object beam and said laser reference beam comprises a beam splitter means attache to said placement means.

7. The apparatus as in claim 6 further characterized in that said beam splitter means comprises mirrors or lenses.

8. The apparatus as in claim 1 further characterized in that said lasing means comprises a plurality of different colored lasers.

9. The apparatus as in claim 8 further characterized in that said plurality of different colored lasers comprise three different colored lasers able to generate a full color hologram.

10. The apparatus as in claim 1 wherein the multilayer fiber comprises at least three layers comprising a core fiber having a diameter small enough that said core fiber performs as a single mode laser reference beam waveguide, and said core fiber, a central layer, and an outer layer have indices of refraction which enable said central layer to perform as an object beam waveguide.

11. An apparatus for laser holographic examination of the internal features of cavities and passageways of a structure comprising:

laser means capable of generating a laser beam external to said structure;

laser beam waveguide means comprising a multilayer fiber coupled to said lasing means and for conducting portions of said laser beam generated external to said structure in at least two different layers of the multilayer fiber to said cavities and passageways of said structure to provide at least two internal laser beams for illuminating said internal features for hologram formation;

means for establishing a laser object beam from one of said internal laser beams within said structure.

means for establishing a laser reference beam from another of said internal laser beams within said structure;

recordation means capable of obtaining a laser hologram within said structure; and placement means for placing said recordation means within said structure and for recovering said recordation means from said structure.

12. The apparatus as in claim 11 further characterized in that said waveguide means comprises a multilayer fiber having at least three layers comprising a core fiber having a diameter small enough that said core fiber performs as a single mode laser reference beam waveguide and wherein said core fiber, a central layer, and an outer layer have indices of refraction which enable said central layer to perform as an object beam waveguide.

13. The apparatus as in claim 12 wherein said waveguide means comprises a three layer fiber with said core fiber having the largest index of refraction and succeeding layers having a progressively lower index of refraction.

14. The apparatus as in claim 12 further characterized in that said means for establishing a laser reference beam comprises a pinhole aperture positioned adjacent a smooth termination of said core fiber positioned within said structure.

15. The apparatus as in claim 11 wherein a grating is positioned on the distal end of at object beam fiber portion of said waveguide.

16. The apparatus as in claim 11 further characterized in that said lasing means comprises a plurality of different colored lasers.

17. The apparatus as in claim 16 further characterized in that said plurality of different colored lasers comprises three different colored lasers able to generate a full color hologram.

* * * * *

UNITED STATES PATENT AND TRADEMARK OFFICE
CERTIFICATE OF CORRECTION

PATENT NO. : 4,792,196
DATED : December 20, 1988
INVENTOR(S) : Raviv, et al.

It is certified that error appears in the above-identified patent and that said Letters Patent is hereby corrected as shown below:

Column 5, Line 42, change "20 such" to --20, such--.

Column 5, Line 51, change "i,," to --is, --

Column 7, Line 37, change "within structure" to -- within a structure--.

Column 7, Line 38, change "interferggram" to --interferogram--.

Column 10, Line 20, change "at" to --an--.

Signed and Sealed this

Twenty-second Day of August, 1989

Attest:

DONALD J. QUIGG

Attesting Officer

Commissioner of Patents and Trademarks